(12) United States Patent
Urbanek (10) Patent No.: US 7,600,011 B1
(45) Date of Patent: Oct. 6, 2009

(54) USE OF A DOMAIN NAME SERVER TO DIRECT WEB COMMUNICATIONS TO AN INTERMEDIATION PLATFORM

(75) Inventor: Robert Urbanek, Belton, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 861 days.

(21) Appl. No.: 10/982,318

(22) Filed: Nov. 4, 2004

(51) Int. Cl.
*G06F 15/173* (2006.01)
(52) U.S. Cl. .................. 709/223; 709/203; 709/226
(58) Field of Classification Search ................ 709/203, 709/223, 226
See application file for complete search history.

(56) References Cited

U.S. PATENT DOCUMENTS

| | | |
|---|---|---|
| 5,077,790 A | 12/1991 | D'Amico et al. |
| 5,708,780 A | 1/1998 | Levergood et al. |
| 5,764,188 A | 6/1998 | Ghosh et al. |
| 5,908,469 A | 6/1999 | Botz et al. |
| 5,930,777 A | 7/1999 | Barber |
| 5,933,498 A | 8/1999 | Schneck et al. |
| 5,961,593 A | 10/1999 | Gabber et al. |
| 6,029,141 A | 2/2000 | Bezos et al. |
| 6,035,281 A | 3/2000 | Crosskey et al. |
| 6,037,935 A | 3/2000 | Bates et al. |
| 6,052,730 A | 4/2000 | Felciano et al. |
| 6,092,196 A | 7/2000 | Reiche |
| 6,101,510 A | 8/2000 | Stone et al. |
| 6,112,242 A | 8/2000 | Jois et al. |
| 6,121,970 A | 9/2000 | Guedalia |
| 6,134,680 A | 10/2000 | Yeomans |
| 6,161,185 A | 12/2000 | Guthrie et al. |
| 6,178,511 B1 | 1/2001 | Cohen et al. |
| 6,195,545 B1 | 2/2001 | Baker et al. |
| 6,199,077 B1 | 3/2001 | Inala et al. |
| 6,199,079 B1 | 3/2001 | Gupta et al. |
| 6,202,087 B1 | 3/2001 | Gadish |
| 6,233,608 B1 | 5/2001 | Laursen et al. |
| 6,247,048 B1 | 6/2001 | Greer et al. |

(Continued)

FOREIGN PATENT DOCUMENTS

WO    WO 9843177    10/1998

(Continued)

OTHER PUBLICATIONS

Network Appliance, "Internet Content Adaptation Protocol (ICAP)," pp. 1-13, Jul. 30, 2001.

(Continued)

*Primary Examiner*—Phuoc Nguyen (57) ABSTRACT

A Domain Name Server (DNS) directs web communications to an intermediation platform. The DNS comprises data storage containing (i) host data that correlates each of a plurality of domain names with a respective host server network address and (ii) whitelist data that correlates at least a given domain name with an intermediation platform network address; a communication interface for receiving correlation requests and for transmitting correlation responses, wherein, when the DNS receives a correlation request that seeks a network address correlated with the given domain name, the DNS determines by reference to the whitelist data that the given domain name is correlated with the intermediation platform network address, and the DNS responsively returns a correlation response providing the intermediation platform network address as the network address correlated with the given domain name.

28 Claims, 7 Drawing Sheets

U.S. PATENT DOCUMENTS

| | | | |
|---|---|---|---|
| 6,253,193 | B1 | 6/2001 | Ginter et al. |
| 6,266,681 | B1 | 7/2001 | Guthrie |
| 6,269,460 | B1 | 7/2001 | Snover |
| 6,304,913 | B1 * | 10/2001 | Rune .......................... 709/241 |
| 6,311,215 | B1 | 10/2001 | Bakshi et al. |
| 6,317,718 | B1 | 11/2001 | Fano |
| 6,321,256 | B1 | 11/2001 | Himmel et al. |
| 6,407,680 | B1 | 6/2002 | Lai et al. |
| 6,421,733 | B1 | 7/2002 | Tso et al. |
| 6,434,614 | B1 | 8/2002 | Blumenau |
| 6,457,030 | B1 | 9/2002 | Adams et al. |
| 6,510,458 | B1 | 1/2003 | Berstis et al. |
| 6,510,464 | B1 | 1/2003 | Grantges et al. |
| 6,519,631 | B1 | 2/2003 | Rosenschein et al. |
| 6,535,896 | B2 | 3/2003 | Britton et al. |
| 6,560,607 | B1 | 5/2003 | Lassesen |
| 6,582,474 | B2 | 6/2003 | LaMarca et al. |
| 6,590,588 | B2 | 7/2003 | Lincke et al. |
| 6,594,697 | B1 | 7/2003 | Praitis et al. |
| 6,643,641 | B1 | 11/2003 | Snyder |
| 6,684,249 | B1 | 1/2004 | Frerichs et al. |
| 6,687,732 | B1 | 2/2004 | Bector et al. |
| 6,694,484 | B1 | 2/2004 | Mueller |
| 6,704,773 | B1 | 3/2004 | Cohn et al. |
| 6,721,780 | B1 | 4/2004 | Kasriel et al. |
| 6,826,597 | B1 | 11/2004 | Lonnroth et al. |
| 6,832,239 | B1 | 12/2004 | Kraft et al. |
| 6,874,018 | B2 | 3/2005 | Wu |
| 6,880,123 | B1 | 4/2005 | Landsman et al. |
| 6,892,181 | B1 | 5/2005 | Megiddo et al. |
| 6,910,068 | B2 | 6/2005 | Zintel et al. |
| 6,912,571 | B1 | 6/2005 | Serena |
| 6,918,090 | B2 | 7/2005 | Hesmer et al. |
| 6,925,485 | B1 | 8/2005 | Wang et al. |
| 6,987,987 | B1 | 1/2006 | Vacanti et al. |
| 7,080,158 | B1 | 7/2006 | Squire |
| 7,107,309 | B1 | 9/2006 | Geddes et al. |
| 7,210,094 | B2 | 4/2007 | Dovin et al. |
| 7,289,519 | B1 * | 10/2007 | Liskov ........................ 370/400 |
| 7,310,686 | B2 * | 12/2007 | Uysal ......................... 709/245 |
| 7,360,210 | B1 * | 4/2008 | Vacanti et al. .............. 709/246 |
| 2001/0035885 | A1 | 11/2001 | Iron et al. |
| 2002/0007393 | A1 | 1/2002 | Hamel |
| 2002/0047859 | A1 | 4/2002 | Szlam et al. |
| 2002/0059396 | A1 | 5/2002 | Holzer et al. |
| 2002/0099738 | A1 | 7/2002 | Grant |
| 2002/0120564 | A1 | 8/2002 | Strietzel |
| 2002/0129064 | A1 | 9/2002 | Guthrie |
| 2002/0165925 | A1 | 11/2002 | Hamilton, II et al. |
| 2003/0005157 | A1 * | 1/2003 | Chung et al. ................ 709/245 |
| 2003/0018668 | A1 | 1/2003 | Britton et al. |
| 2003/0023634 | A1 | 1/2003 | Justice et al. |
| 2003/0032413 | A1 | 2/2003 | Aksu et al. |
| 2003/0055878 | A1 | 3/2003 | Fletcher et al. |
| 2003/0058271 | A1 | 3/2003 | Van Der Meulen |
| 2003/0110296 | A1 | 6/2003 | Kirsch et al. |
| 2003/0177248 | A1 | 9/2003 | Brown et al. |
| 2003/0187806 | A1 | 10/2003 | Banerjee et al. |
| 2003/0191801 | A1 * | 10/2003 | Paul ........................... 709/203 |
| 2004/0059783 | A1 | 3/2004 | Kazui et al. |
| 2005/0055422 | A1 | 3/2005 | Campbell et al. |
| 2005/0066012 | A1 | 3/2005 | Campbell et al. |
| 2005/0086298 | A1 | 4/2005 | Campbell et al. |
| 2005/0138432 | A1 | 6/2005 | Ransom et al. |
| 2005/0144557 | A1 | 6/2005 | Li et al. |
| 2006/0031314 | A1 * | 2/2006 | Brahms et al. .............. 709/206 |
| 2006/0259625 | A1 * | 11/2006 | Landfeldt et al. ........... 709/227 |

FOREIGN PATENT DOCUMENTS

| | | |
|---|---|---|
| WO | WO 03065678 | 8/2003 |

OTHER PUBLICATIONS

IBM, "Intermediaries: An Approach to manipulating Information Streams", http://www.research.ibm.com/journal/sj/384/barrett.html, IBM Systems Journal, vol. 38, No. 4, 1999.

First USENIX Workshop on Electronic Commerce, Jul. 1995, Payment Switches for Open Networks, http://www.usenix.org/publications.library/proceedings/ec95/gifford.html, printed from the World Wide Web on Apr. 15, 2002.

USENIX, "Payment Switches for Open Networks," Proceedings of the First USENIX Workshop on Electronic Commerce, New York, New York, Jul. 1995, http://www.usenix.org/publications/library/proceedings/ec95/full _papers/gifford.txt, printed from the World Wide Web on Apr. 15, 2002.

Redknee, "Mobile Multimedia Gateway," http://www.redkneww.com/products/rk_pro_net_mobilemultimediagateway.php, printed from the World Wide Web on Apr. 15, 2002.

"Open Pluggable Edge Services (OPES)," http://www.ietf-opes.org/oldindex.html, printed from the World Wide Web on Apr. 15, 2002.

IBM, "Web Intermediaries (WBI)," http://www.almaden.ibm.com/cs/wbi/index.html, printed from the World Wide Web on Apr. 30, 2002.

IBM, "Plugins," http://www.almaden.ibm.com/cs/wbi/Plugins.html, printed from the World Wide Web on Apr. 30, 2002.

IBM, "WebPlaces: Adding People to the Web," http://www.almaden.ibm.com/cs/wbi/papers/www8/wwwplaces-abstract.html, printed from the World Wide Web on Apr. 30, 2002.

IBM, "WebSphere Edge Server—Product Overview—IBM Software," http://www-3.ibm.com/software/webservers/edgeserver/, printed from the World Wide Web on Sep. 3, 2002.

Bridgewater Systems, "Content Access Controller," http://www.bridgewatersystems.com/products/content_controller/?BSCID=d8f8772, printed from the World Wide Web on Sep. 3, 2002.

A. Barbir et al., "An Architecture for Open Pluggable Edge Services (OPES)," Network Working Group, Internet-Draft, Aug. 2, 2002.

A. Barbir et al., "OPES Use Cases and Deployment Scenarios," Network Working Group, Internet-Draft, Aug. 5, 2002.

A. Beck et al., "Requirements for OPES Callout Protocols," Internet-Draft, Aug. 2, 2002.

A. Beck et al., "Example Services for Network Edge Proxies," Internet Draft, Nov. 21, 2000.

IBM, Location-based services, http://www-106.ibm.com/developerworks/ibm/library/l-lbs/, printed from the World Wide Web on May 23, 2003.

Identifying Web Users in a Proxy Server, U.S. Appl. No. 09/466,104 (Applicants do not have a copy of the cited patent application).

Extracting Contents of a Document During Delivery, U.S. Appl. No. 09/512,974 (Applicants do not have a copy of the cited patent application).

Secure Network Proxying, U.S. Appl. No. 09/512,975 (Applicants do not have a copy of the cited patent application).

Expediting the Retrieval of External Components Referenced in a Document, U.S. Appl. No. 09/512,976 (Applicants do not have a copy of the cited patent application).

Commerical Activity Performed in Conjunction with Document Retrieval, U.S. Appl. No. 09/512,977 (Applicants do not have a copy of the cited patent application).

Modifying Contents of a Document During Delivery, U.S. Appl. No. 09/513,217 (Applicants do not have a copy of the cited patent application).

Fielding et al. "Request for Comments (RFC) 2616: Hypertext Transfer Protocol—HTTP/1.1", published by Network Working Group, Jun. 1999.

Pollock, "A Custom 404 Page", www.pagesource.com/zine/custom404.htm, Apr. 18, 1999.

4GuysFrom Rolla.com, "Creating a Custom 404 Error Page", publicly posted Apr. 21, 1999.

The Apache Foundation, "Custom Error Responses", Apache HTTP Server Version 1.3, documentation released Dec. 5, 2001.

American Express Company 2001, http://www.26.americanexpress.com/privatepayments/fag.jsp, printed from the World Wide Web on Oct. 17, 2002.

Thomason, Larisa, "Load Time Tip: Reuse, Optimize, and preload Images" http://www.netmechanic.com/news/vol_13/loadtime_no6.htm, vol. 3, No. 6, Jun. 2000.

Wang et al., "Department of Computer Science, University College London, London WC1E 6BT, United Kingdom", 1996.

Tong et al., Alleviating the Latency and Bandwidth Problems in WWW Browsing, http://www.usenix.org/publications/library/proceedings/usits97/full_papers/tong/tong_html, Oct. 26, 1997.

Padmanabhan et al., "Using Predictive Prefetching to Improve World Wide Web Latency", 1996.

Jacobson et al., "Potential and Limits of Web Prefetching Between Low-Bandwidth Clients and Proxies", 1998.

Jiang et al., "Web Prefetching in a Mobile Environment" IEEE Personal Communications, pp. 25-34, Oct. 1998.

Davison, "Predicting Web Actions from HTML Content", Jun. 15, 2002.

Duchamp, "Prefetching Hyperlinks" Usenix, Boulder, Colorado, Oct. 11-14, 1999.

Bestavros, Azer, "Speculative Data Dissemination and Service to Reduce Server Load, Network Traffic and Service Time in Distributed Information Systems" Mar. 1996.

Wcol, "WWW Collector Home Page", http://shika.aist-nara.ac.jp/products/wcol/wcolE.html, printed from the World Wide Web on Jul. 1, 2003.

Chinen, et al., "An Interactive Prefetching Proxy Server for Improvement of WWW Latency", http://www.isoc.org/inet97/proceedings/A1/A1_3htm, Jul. 3, 2003.

The List Preload Images, http://www.lists.evolt.org/archive/Week-of-mon-20020204/067827.html.

Burns, "So, You Want to Pre-Load, Hugh?", http://www.htmlgoodies.com/tutors/preload.html, printed from the World Wide Web on Nov. 14, 2002.

Google Groups, "Lewis, Stephen, Newsgroup Message, dated Jul. 24, 2000", http://groups-beta.google.com/group/microsoft.public/webdesign.html.

Introduction to SSL, http://developer.netscape.com/docs/manuals/security/sslin/contents.htm, Oct. 9, 1998.

Gerck, E., Ph.D., "Overview of Certification Systems: X.509, PKIX, CA, PGP & SKIP" Jul. 18, 2000.

Gerck, E., "Overview of Certification Systems: X.509, CA, PGP and SKIP" http://mcg.org.br/cert.htm, Apr. 17, 1997.

X.509, http://www.hsc.fr/resources/presentations/pki/img9.htm, 1999.

Trusted Computing Platform Alliance (TCPA), "Building a Foundation of Trust in the PC" Jan. 2000.

Carroll, Amy; Juarez, Mario; Polk, Julia and Leininger, Tony, "Microsoft "Palladium": A Business Overview", http://www.microsoft.com/presspass/features/2002/jul02/0724palladiumwp.asp, Jan. 25, 2003.

Anderson, Ross., "TCPA / Palladium Frequently Asked Questions", Version 1.0. http://www.cl.cam.ac.uk/~rja14/tcpa-faq.html, Jan. 16, 2003.

Internet Explorer SSL Vulnerability, http://www.thoughtcrime.org/ie-ssl-chain.txt, Aug. 5, 2002.

ZDNet: Tech Update: Enterprise Application/Single Sign-on Battle Looms, http://techupdate.zdnet.com/techupdate/stories/main/0,14179,2824248,00.html, printed from the World Wide Web on Feb. 19, 2002.

Introduction to Single Sign-On, http:www.opengroup.org/security/sso/sso_intro.htm, printed from the World Wide Web on Feb. 19, 2002.

Novell: Novell SecureLogin, http://www.novel.com/source/printer_friendly/ ql20017_en.html, printed from the World Wide Web on Feb. 19, 2002.

Lemay, Teach Yourself Web Publishing with HTML 3.0 in a Week, published by Sams.net, p. 65, 1996.

U.S. Appl. No. 10/128,828, filed Apr. 24, 2002.
U.S. Appl. No. 10/189,941, filed Jul. 3, 2002.
U.S. Appl. No. 10/189,937, filed Jul. 3, 2002.
U.S. Appl. No. 10.189,892, filed Jul. 3, 2002.
U.S. Appl. No. 10/190,362, filed Jul. 3, 2002.
U.S. Appl. No. 10/189,720, filed Jul. 3, 2002.

\* cited by examiner

TABLE 450

| Domain Name | Host IP Address | Intermediate? | Intermediation IP Address |
|---|---|---|---|
| www.yahoo.com | 135.100.200.001 | No | -- |
| www.wsj.com | 179.200.136.002 | Yes | 146.134.102.100 |
| www.spcs.com | 253.252.100.020 | No | -- |
| www.tribune.com | 109.354.300.087 | Yes | 146.134.102.100 |
| www.usatoday.com | 142.137.89.201 | Yes | 152.101.189.209 |
| . | . | . | . |
| . | . | . | . |
| . | . | . | . |

USE OF A DOMAIN NAME SERVER TO DIRECT WEB COMMUNICATIONS TO AN INTERMEDIATION PLATFORM

BACKGROUND

1. Technical Field

The present invention relates to telecommunications and, more particularly, to use of a Domain Name Server (DNS) to direct web communications to an intermediation platform.

2. Description of Related Art

It is known to provide an intermediation platform that acts upon web communications being transmitted between a web client and a web server. Such a platform could sit within the communication path between the web client and web server so that any web communications passing between the client and server would necessarily flow through the platform. When the platform receives a given web communication, the platform could then apply a whitelist or other data to determine whether to perform an intermediation action and, if so, what sort of action to perform. And the platform could then perform the intermediation action, and pass the web communication along the web communication path to its intended destination.

Alternatively, an entity within the web communication path could apply a whitelist or other data to determine that a given web communication should be passed to the intermediation platform for handling, and the entity could responsively pass the communication to the intermediation platform. The intermediation platform could then perform an intermediation action and then pass the communication back to the entity. And the entity could then pass the communication along the web communication path to its intended destination.

This works well where it is certain that web communications will pass through a common entity such as the intermediation platform itself or an entity that can shunt web communications to the intermediation platform. For example, if an Internet Service Provider (ISP) has an access gateway through which all web communications pass, the ISP could have the gateway apply a whitelist that causes the gateway to shunt certain communications to an intermediation platform.

Unfortunately, however, inefficiency can arise in a scenario where web communications do not all pass through a common entity. For instance, if an ISP has multiple access gateways, each providing Internet connectivity for a respective access network, web communications with client stations in the various access networks may pass through different gateways and not through a common entity. In that scenario, intermediation could be provided by placing an intermediation platform respectively in each access channel or by programming the access gateways with whitelist data that causes the gateways to shunt certain web communications to an intermediation platform. Provisioning and upkeep of multiple intermediation platforms and/or multiple sets of whitelist data, however, is costly and difficult. Thus, a better solution is desired.

SUMMARY

Most web requests specify a web server by domain name rather than by IP address, and a Domain Name Server (DNS) is conventionally queried in order to translate the domain name into the host server IP address. Further, in a network that includes multiple access gateways, it is typical for all of the access gateways to use a common DNS. According to the invention, a DNS is modified to include a whitelist function that causes the DNS to direct certain web requests to an intermediation platform instead of to the requested web server. Advantageously, this obviates the need to put an intermediation platform in each web communication path or to program an entity (such as a gateway) in each path to shunt communications to an intermediation platform. Certain domain names are flagged to be translated by the DNS to an address of an intermediation platform rather than to an address of an actual web host server.

In some embodiments, a network entity, such as a gateway, may receive a web request from a web client. The request will typically request content from a web server by specifying a domain name associated with that server. To translate this domain name into a network address, such as an IP address, the network entity sends a correlation request (DNS query) directed to that domain name to a DNS. Upon receiving the correlation request, the DNS determines that the domain name is correlated with an IP address of an intermediation platform, and responsively transmits a correlation response to the network entity, providing that IP address.

Upon receiving the correlation response containing the IP address of the intermediation platform, the network entity sends the web request to that IP address. Upon receiving the web request, the intermediation platform performs one or more intermediation actions with respect to the web request, and then sends the request on to the requested web server. Note that the intermediation platform may make a DNS query of its own to discover the IP address of the requested web server. The DNS, realizing that this subsequent DNS query comes from the intermediation platform itself, in that case returns the address of the actual web host server.

Thus, in one respect, an exemplary embodiment of the present invention may take the form of a DNS comprising data storage containing (i) host data that correlates each of a plurality of domain names with a respective host server network address and (ii) whitelist data that correlates at least a given domain name with an intermediation platform network address; a communication interface for receiving correlation requests and for transmitting correlation responses, wherein, when the DNS receives a correlation request that seeks a network address correlated with the given domain name, the DNS determines by reference to the whitelist data that the given domain name is correlated with the intermediation platform network address, and the DNS responsively returns a correlation response providing the intermediation platform network address as the network address correlated with the given domain name.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
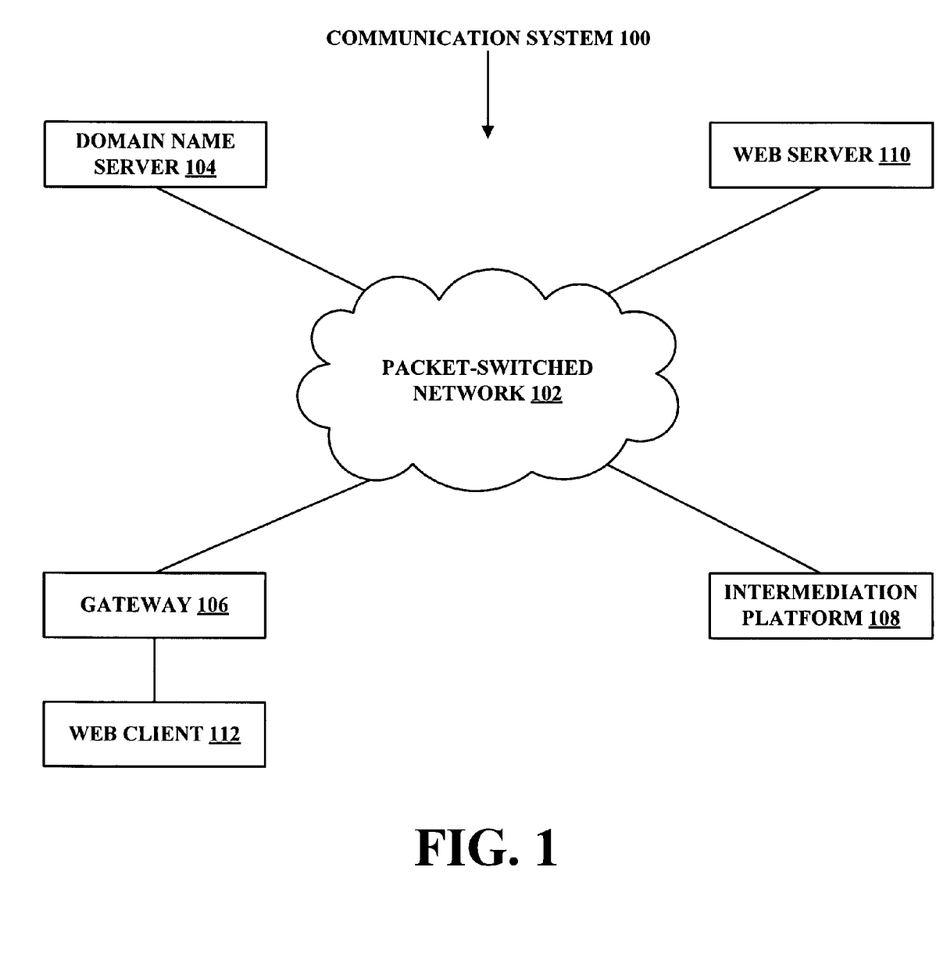
FIG. 1 is a simplified block diagram of an example of a communication system, in accordance with exemplary embodiments.

FIG. 1 is a simplified block diagram of an example of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, the communication system 100 includes a packet-switched network 102, a domain name server (DNS) 104, a gateway 106, an intermediation platform 108, a web server 110, and a web client 112. It should be understood that the entities depicted in FIG. 1 are illustrative. In general, there could be any number of gateways, intermediation platforms, and web servers in communication with network 102. And there could be any number of web clients in communication with gateway 106, other gateways, or with network 102.

Packet-switched network 102 may include one or more wide area networks (WANs), one or more local area networks (LANs), one or more public networks such as the Internet, and/or one or more private networks. Devices in communication with the network 102, such as DNS 104, gateway 106, intermediation platform 108, and web server 110, may transmit and receive data using a packet-switched protocol such as the Internet Protocol (IP), and may be identified by an address such as an IP address.

Figure 4:
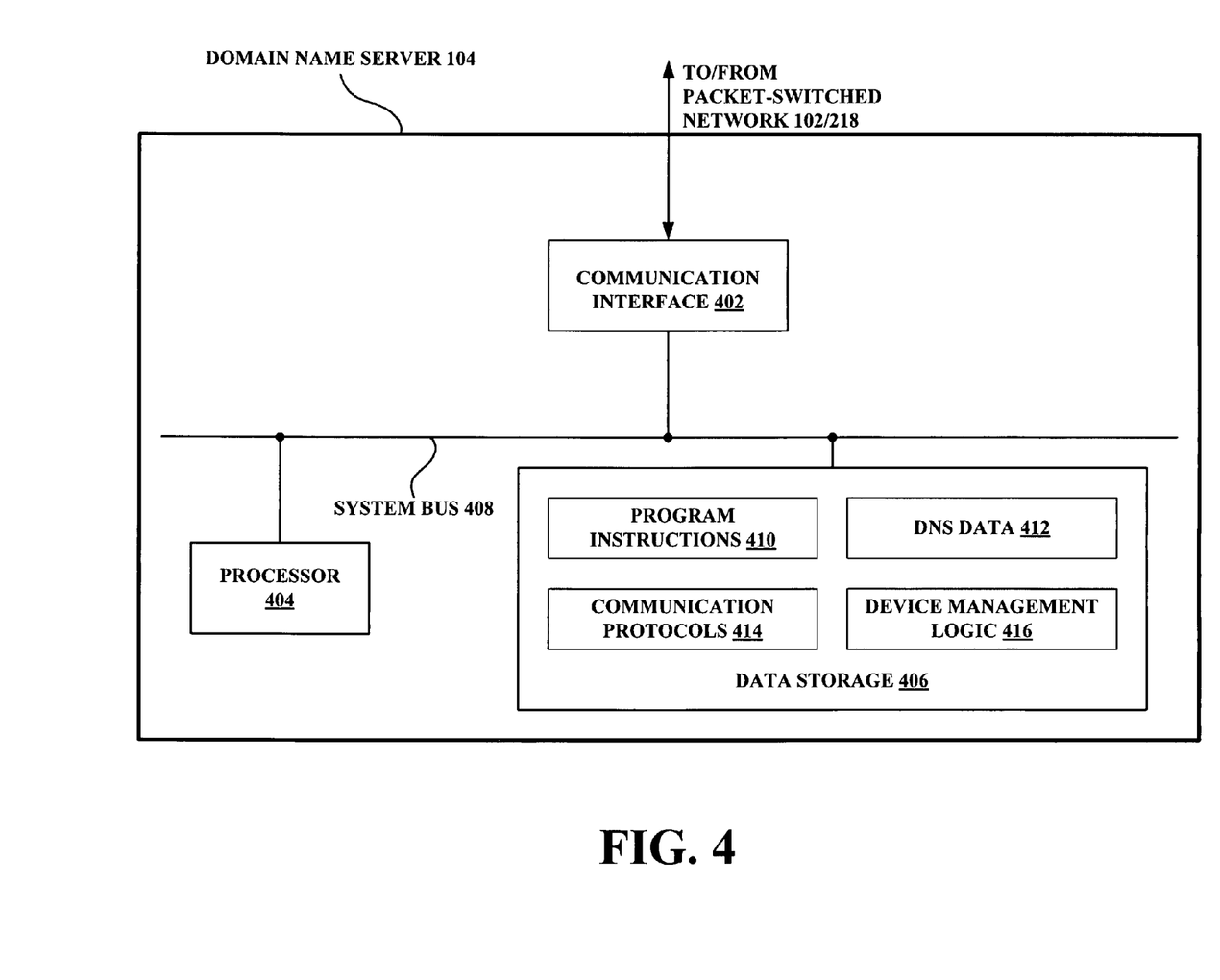
FIG. 4 is a simplified block diagram of an exemplary domain name server, which may be used in accordance with exemplary embodiments.
Figure 5:
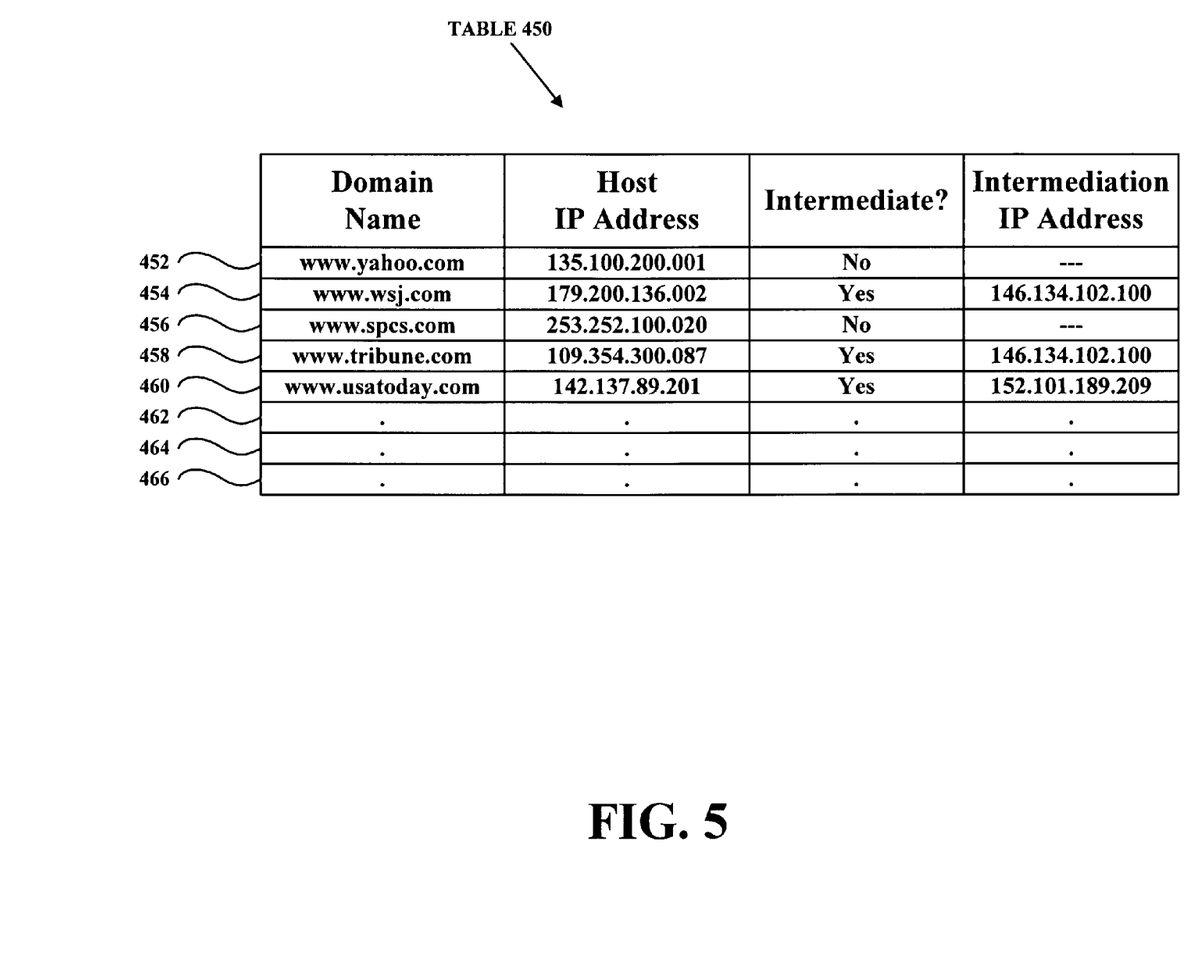
FIG. 5 is a simplified block diagram of a data table that may be stored in the domain name server of FIG. 4, and which may be used in accordance with exemplary embodiments.

DNS 104 is described more fully in connection with FIGS. 4 and 5. Generally, DNS 104 may take the form of a network server configured to communicate over network 102 and to carry out the functions described herein, among which is serving requests to correlate particular domain names with IP addresses. And more specifically, DNS 104 is configured to receive such a correlation request, determine that the relevant domain name is correlated with an IP address of an intermediation platform, such as intermediation platform 108, and return that IP address rather than the IP address of the actual web host server having that domain name.

Gateway 106 may also take the form of a network server configured to communicate over network 102 and to carry out the functions described herein. Generally, gateway 106 may take the form of or be a functional part of a packet data serving node (PDSN), which is a network entity known in the art. Gateway 106 functions as a network access server (NAS), providing entities such as web client 112 access to network 102. As examples, gateway 106 may be a wireless access gateway or a voice command gateway, as described more fully herein. Gateway 106 may also be an ISP (Internet Service Provider) gateway, by which an ISP may provide Internet connectivity to one or more customers, such as businesses and individuals.

Intermediation platform 108 may also take the form of a network server configured to communicate over network 102 and to carry out the functions described herein. Generally, intermediation platform 108 receives web requests that have been redirected to intermediation platform 108 by the interaction of a web client such as web client 112, a gateway such as gateway 106, and DNS 104. Intermediation platform 108 performs one or more intermediation actions with respect to the request, and then sends the request on to the actual host server for which the request was originally intended. As examples, the intermediation actions may include seeking payment from a web client in connection with the request, or supplementing the request with user information, such as user payment information, or with other information.

Web server 110 may also take the form of a network server configured to communicate over network 102 and to carry out the functions described herein. In general, web server 110 may function to receive web requests—such as HTTP (HyperText Transfer Protocol) requests—from web clients such as web client 112, and serve those requests by transmitting web responses—such as HTTP responses—to the requesting web client.

Web client 112 may be any computing device capable of engaging in packet-data communication, and specifically of sending and receiving web requests and responses, and for acquiring access to network 102 via a gateway such as gateway 106. As examples, web client 112 may be a personal computer such as a laptop or desktop computer, a cellular telephone, or a personal digital assistant (PDA). Web client 112 may be any of these devices in their entirety, or perhaps a functional part of any of these devices. In connection with FIGS. 2 and 3, web client 112 is described, as an example, as being a functional part of a cellular wireless communication device, such as a cell phone, capable of engaging in packet-data communication.

In operation, web client 112 acquires packet-data connectivity over network 102 via gateway 106. One way in which this could occur is described below in connection with FIGS. 2 and 3. Web client 112 then generates and transmits a web request intended for web server 112. This request may take the form of an HTTP request addressed to a URL (Uniform Resource Locator) such as www.webserver110.com/index.html. Web client 112 may generate this request as a result of a user clicking on a particular hyperlink, for example.

When the web request arrives at gateway 106, gateway 106 sends a correlation request to DNS 104, requesting an IP address associated with the above-mentioned domain name (www.webserver110.com). When DNS 104 receives this correlation request, sometimes referred to as a "DNS query," DNS 104 first checks a stored table of whitelist data for an entry corresponding to this domain name. If no such entry is found, DNS 104 transmits a correlation response to gateway 106 that provides the actual host server IP address of web server 110, which DNS 104 has stored in a data table that correlates domain names to actual host IP addresses. This table may be updated from time to time by what are known in the art as "multicast updates." Gateway 106 would then transmit the web request to the provided actual-host IP address.

If, however, DNS 104's whitelist data does include an entry corresponding to the domain name www.webserver110.com, DNS 104 will still send a correlation response to gateway 106, though in this case the correlation response contains an IP address of an intermediation platform, such as intermediation platform 108. This correlation between the domain name and the IP address of intermediation platform 108 is provided, in this example, in the whitelist data stored by DNS 104. This whitelist data may also be updated from time to time via multicast updates.

Upon receipt of the correlation response containing the IP address of intermediation platform 108, gateway 106 transmits the web request to that address. Intermediation platform 108 then performs one or more intermediation actions with respect to the web request, such as seeking payment from web client 112 or supplementing the request with user-payment or other information. Intermediation platform 108 then queries DNS 104 for the IP address associated with www.webserver110.com. Recognizing that this correlation request comes from intermediation platform 108, DNS 104 returns the actual host IP address of web server 110 to intermediation platform 108 in a correlation response, rather than returning the IP address of intermediation platform 108, which would cause an illogical and infinite loop of messaging. Upon receipt of the web request, web server 110 serves the request in its usual manner.

Thus, the web request was redirected from gateway 106 to intermediation platform 108 before reaching web server 110. And this would have been the case regardless of which gateway was used to access network 102, since each such gateway would have queried DNS 104 and received a response directing that the web request be sent to the IP address of intermediation platform 108, rather than directly to the actual host IP address of web server 110.

2. Exemplary Architecture a. Exemplary Cellular Wireless Communication System

Figure 2:
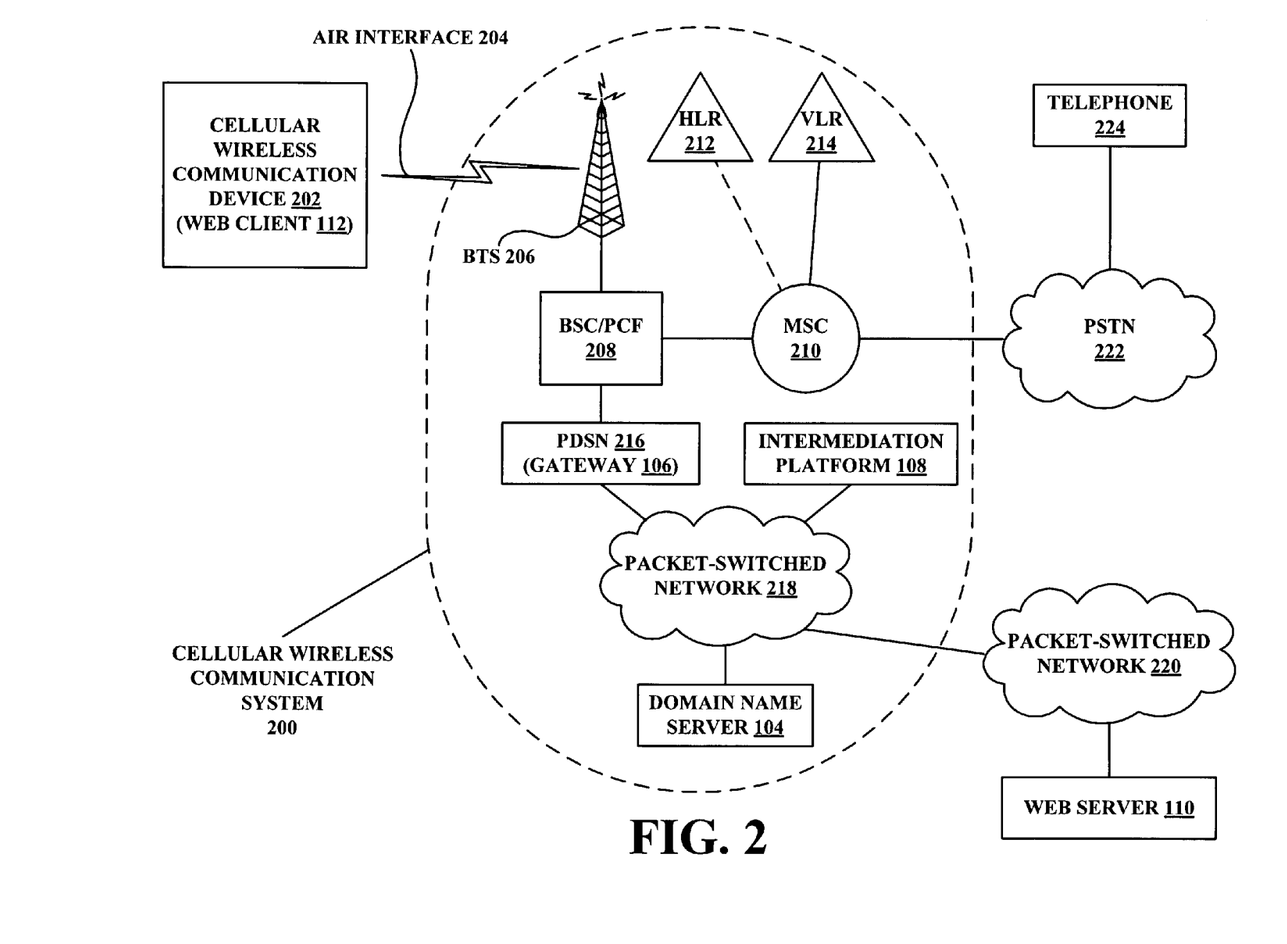
FIG. 2 is a simplified block diagram of an exemplary cellular wireless communication system, in accordance with exemplary embodiments.

FIG. 2 is a simplified block diagram of an exemplary cellular wireless communication system, in accordance with exemplary embodiments. It should be understood that a cellular wireless communication system could take many other forms as well, and that the arrangement shown in FIG. 2 is provided by way of example. It should further be understood that the inclusion of a cellular wireless communication system in this description of exemplary embodiments is itself illustrative and not necessary to carrying out the present invention.

As shown in FIG. 2, the cellular wireless communication system (CWCS) 200 includes a base transceiver station (BTS) 206, a base station controller/packet control function (BSC/PCF) 208, and a mobile switching center (MSC) 210, which are arranged and coupled with each other in a manner well known in the cellular telephony field. CWCS 200 could also be referred to as a "wireless access network" or "radio access network", since cellular wireless communication devices (CWCDs) communicate wirelessly with CWCS 200 via an RF air interface.

BTS 206 comprises a tower with antennas that radiate to define a wireless air interface 204. And BSC 208 communicates with wireless devices over that air interface according to an agreed protocol. Example air interface protocols include Advanced Mobile Phone Service (AMPS), Code Division Multiple Access (CDMA), Time Division Multiple Access (TDMA), and Global System for Mobile communication (GSM). As an example, the air interface protocol could be a CDMA protocol that complies with the well known standards IS-95 and cdma2000®, which are hereby incorporated by reference.

MSC 210 then functions as a switch to provide connectivity with other switches in the Public Switched Telephone Network (PSTN) 222. Further, MSC 210 may be coupled via a signaling link with a home location register (HLR) 212 that stores service profiles for various wireless devices. And MSC 210 may include or be interconnected with a visitor location register (VLR) 214 that stores local copies of those profiles for wireless devices that are currently operating within the wireless coverage area of MSC 210. Although FIG. 2 shows BSC 208 and MSC 210 as separate entities, the two could instead be co-located and integrated together.

CWCS 200 enables suitably-equipped wireless devices, such as CWCD 202, to place and receive calls over PSTN 222 and/or over one or more other circuit-switched or packet-switched transport networks. CWCD 202 may be any cellular wireless communication device, and is explained more fully in connection with FIG. 3. As examples, CWCD 202 may be a cellular telephone, a personal digital assistant, a laptop computer having a wireless communication modem, or any other device arranged to communicate over an air interface with a CWCS such as CWCS 200. In this example, CWCD 202 is a cellular telephone capable of engaging in packet-data communication. As such, CWCD 202 is configured to execute a program such as a web browser, which in this example is the web client 112 of FIG. 1.

Conventionally, CWCD 202 will subscribe to service with a wireless carrier that operates CWCS 200. Therefore, the carrier would have set up CWCD 202 to operate under a particular directory number, often known as a "mobile identification number" or "mobile directory number." In particular, the carrier would have programmed the assigned directory number into a Number Assignment Module block of CWCD 202, and the carrier would have established a service-profile record in HLR 212 for that directory number/device. Further, CWCD 202 would have a unique electronic serial number (ESN), which may be hard coded or programmed into it.

When CWCD 202 powers on or otherwise enters into the coverage of air interface 204, CWCD 202 registers with MSC 210, such as by sending a registration message over an access channel and via BSC 208 to MSC 210. MSC 210, in cooperation with other network entities, would then authenticate the device, and HLR 212 would provide MSC 210 with a copy of CWCD 202's service profile for storage in VLR 214, and for later reference by MSC 210. Thereafter, CWCD 202 may conduct calls on PSTN 222 via CWCS 200, as is known in the art.

For providing packet-data connectivity to CWCD 202, CWCS 200 includes a PDSN 216, and BSC/PCF 208 includes a packet control function for facilitating communication between CWCD 202 and PDSN 216. In operation, CWCD 202 may request packet-data connectivity by sending a packet-data origination request over an access channel to BSC/PCF 208. BSC/PCF 208 may then engage in signaling with MSC 210 and with PDSN 216, and PDSN 216 and CWCD 202 may negotiate over a traffic channel to establish a data link, such as a point-to-point protocol connection, between CWCD 202 and PDSN 216. Once that is successful, PDSN 216 acts as a wireless access gateway, or network access server, providing CWCD 202 access to the carrier's packet network 218. Network 218 may then be connected by a suitable gateway to a packet-switched network 220, which may include the Internet, among other networks.

In relation to FIG. 1, network 102 includes both network 218 and network 220. Also in relation to FIG. 1, PDSN 216 acts as gateway 106 to web client 112. Thus, the messaging and processing may be similar to that described with respect to FIG. 1, with the browser application of CWCD 202 acting as web client 112, and PDSN 216 acting as gateway 106. DNS 104 and intermediation platform 108 may act as described with respect to FIG. 1, communicating with each other over the wireless carrier's packet-switched network 218, rather than over network 102 as a whole. Web server 110 may also act as described with respect to FIG. 1, communicating with intermediation platform 108 and gateway 106 over a combination of networks 220 and 218.

b. Exemplary Cellular Wireless Communication Device

Figure 3:
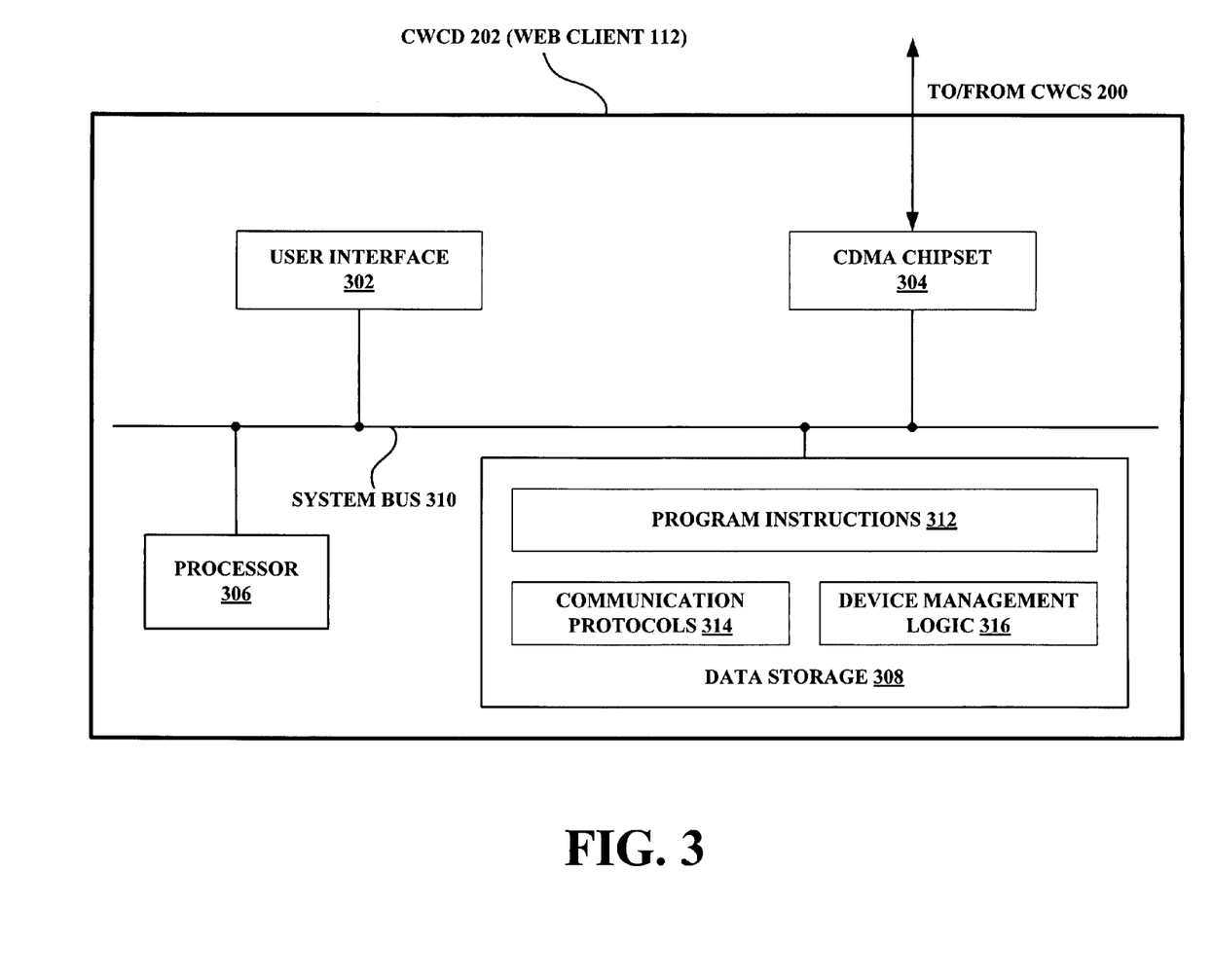
FIG. 3 is a simplified block diagram of an exemplary cellular wireless communication device, which may be used in accordance with exemplary embodiments.

FIG. 3 is a simplified block diagram of an exemplary cellular wireless communication device, which may be used in accordance with exemplary embodiments. In particular, FIG. 3 depicts CWCD 202 of FIG. 2. As shown in FIG. 3, CWCD 202 includes a user interface 302, a CDMA chipset 304, a processor 306, and data storage 308, all of which may be communicatively linked by a system bus 310. In general, CWCD 202 may be any device arranged to communicate over an air interface with a cellular wireless communication system, and to carry out the functions described herein.

User interface 302 includes one or more mechanisms for receiving inputs from users, and one or more mechanisms for communicating outputs to users. Cell phone user interfaces are known in the art of cellular telephony, and thus are not described in detail here. Suffice it to say that user interface 302 may include buttons, a touch screen, a microphone, and any other mechanisms now known or later developed for receiving inputs, as well as an LCD or other display, speakers, and any other mechanisms now known or later developed for communicating outputs. For operating the web browsing application acting as web client 112, user interface 302 may preferably include a touch screen operable by a pointing device such as a stylus.

CDMA chipset 304 may be a chipset arranged to communicate over air interface 204 and with BSC 208 according to a protocol such as cdma2000®. Examples of such chipsets are those available from Qualcomm Incorporated, such as the Qualcomm MSM6150™ chipset. Chipset 304 will then interface with an antenna (not shown) to facilitate air interface communications.

Processor 306 may control many operations of CWCD 202 by executing a set of program instructions 312 stored in the data storage 308, and may comprise multiple (e.g., parallel) processors, such as a general purpose microprocessor and/or a discrete digital signal processor. Data storage 308 may store program instructions 312, communication protocols 314, and device management logic 316. Data storage 308 may take various forms, in one or more parts, such as a non-volatile storage block and/or a removable storage medium. Program instructions 312 may be executable by processor 306 to carry out various functions described herein.

Communication protocols 314 may be useful to receive data from and send data to CWCS 200 and beyond, and may include cdma2000®, HTTP, Session Initiation Protocol (SIP), Real-Time Transport Protocol (RTP), Transmission Control Protocol (TCP), User Datagram Protocol (UDP), Internet Protocol (IP), Simple Mail Transfer Protocol (SMTP), Dynamic Host Configuration Protocol (DHCP), Domain Name Service, Internet Control Message Protocol (IMCP), Point-to-Point Protocol (PPP), Institute of Electrical and Electronics Engineers (IEEE) 802.11x, Bluetooth®, proprietary protocols, and other protocols. Compatible protocols may be stored in other entities in communication with CWCD 202. Device management logic 316 may be used to manage aspects of CWCD 202 such as memory and file management.

c. Exemplary Domain Name Server

FIG. 4 is a simplified block diagram of an exemplary domain name server, which may be used in accordance with exemplary embodiments. In particular, FIG. 4 is a diagram of domain name server (DNS) 104 of FIGS. 1 and 2. As shown in FIG. 4, DNS 104 includes a communication interface 402, a processor 404, and data storage 406, all of which may be communicatively linked by a system bus 408. In general, DNS 104 may be any device arranged to communicate over a packet-switched network and to carry out the functions described herein.

Communication interface 402 enables DNS 104 to communicate over network 102 (and thus over networks 218 and 220), and may include an Ethernet adapter. Alternatively or additionally, DNS 104 may communicate wirelessly with network 102, in which case communication interface 402 may include a wireless-communication chipset and antenna. Communication interface 402 may also include circuitry to communicate locally with other devices over a physical connection such as an Ethernet cable, or a wireless connection such as a wireless LAN, using a protocol such as IEEE 802.11x, or perhaps using Bluetooth® technology. Those devices, such as routers and/or modems, may then communicate over network 102.

Processor 404 may control many operations of DNS 104 by executing a set of program instructions 410 stored in data storage 406, and may comprise multiple (e.g., parallel) processors, such as a general purpose microprocessor and/or a discrete digital signal processor. Data storage 406 may store program instructions 410, DNS data 412, communication protocols 414, and device management logic 416. Data storage 406 may take various forms, in one or more parts, such as a non-volatile storage block and/or a removable storage medium. Program instructions 412 may be executable by processor 404 to carry out various functions described herein.

DNS data 412 may contain one or more data tables that DNS 104 may reference to carry out the functions described herein. Included in DNS data 412 may be host data that correlates each of multiple domain names with a respective host server network address. So, if DNS 104 receives a correlation request directed to a particular domain name for which DNS 104 is not currently storing an association to an intermediation platform network address, DNS 104 may refer to this host data to identify a particular correlated host server network address, and transmit a correlation response to the requesting entity, conveying that host server network address.

FIG. 5 is a simplified block diagram of a data table that may be stored in the domain name server of FIG. 4, and which may be used in accordance with exemplary embodiments. In particular, FIG. 5 depicts a table of whitelist data and host server data that may be stored in DNS data 412. As shown in FIG. 5, table 450 contains whitelist data that correlates each of one or more domain names with a respective intermediation platform network address.

In operation, DNS 104 may reference table 450 if DNS 104 receives a correlation request directed to, for example, the domain name www.yahoo.com; DNS 104 may then reference row 452 of table 450, and determine that this domain name is not correlated with an intermediation platform network address. In that case, DNS 104 would reference the host data in the second column to identify an actual host server network address (135.100.200.001) associated with this domain name, and transmit a correlation response that includes that host server network address.

If, however, DNS 104 receives a correlation request directed to, for example, www.wsj.com, DNS 104 may determine by reference to row 454 of table 450 that that particular domain name is correlated with a network address of an intermediation platform. Note that this determination could be made by reference to a Boolean flag, such as that found in the third column of table 450. If, for example, the Boolean flag is set to "Yes" (or "True"), DNS 104 could then look to the fourth column for the correlated intermediation platform network address. The determination could also be made based on whether or not an address is stored in the fourth column of a particular row. If an address is present, DNS 104 may conclude that the associated domain name is correlated with an intermediation platform network address. If no such address is present, DNS 104 may proceed as described above to the host data.

Back to the example of www.wsj.com in row 454, DNS 104 determines that this domain name is correlated with the intermediation platform network address 146.134.102.100, and responsively transmits a correlation response to the requesting entity, providing this network address as the address correlated with the domain name www.wsj.com.

As long as table 450 is unchanged, DNS 104 will respond with the same intermediation platform network address to successive requests directed to the same domain name, whether or not those requests are from the same source. And more than one domain name may be associated with the same intermediation platform network address, as shown in rows 454 and 458. Thus, a first correlation request directed to www.wsj.com and a second correlation request directed to www.tribune.com would both be answered with a correlation response that includes the intermediation platform network address given in each of those respective rows.

And DNS 104 may correlate one intermediation platform network address with one domain name, and another intermediation platform network address with another domain name, as shown in rows 454 and 460. Thus, a first correlation request directed to www.wsj.com and a second correlation request directed to www.usatoday.com would both be answered with responses providing intermediation platform network addresses, though the response to the first and second correlation requests would each provide a different intermediation platform network address as the network address correlated with the respective domain name.

Note that table 450 is provided merely as an example, and variations are possible. For instance, instead of including separate columns for a Boolean intermediation flag and for an intermediation IP address, the table could combine that information into a single column that either provides an intermediation IP address or does not. Or, normal DNS translation data (domain-name-and-host-IP-address pairs) could be provided in one table, and DNS 104 could, as a precursor, reference a whitelist table that flags certain domain names for intermediation.

DNS 104 contains control logic, perhaps a subset of program instructions 410, to identify situations where the address of the requesting entity matches the intermediation network address that DNS 104 would normally supply in response to a request directed to the particular domain name. In that case, DNS 104 responds with the actual host IP address, to prevent an infinite cycle of messaging. This infinite cycle would occur if the intermediation platform received its own address as the IP address to which to send the web request following intermediation. It would then continually send the request to itself, which is an obviously undesirable result.

Returning to FIG. 4, communication protocols 414 may be necessary to receive and send data over network 102 (and thus networks 218 and 220), and may include SIP, HTTP, RTP, TCP, UDP, IP, SMTP, DHCP, Domain Name Service, IMCP, PPP, IEEE 802.11x, Bluetooth®, multiple proprietary protocols, and any other communication protocols. Compatible protocols may be stored in other entities in communication with DNS 104. Device management logic 416 may be used to manage aspects of DNS 104 such as memory and file management.

3. Exemplary Operation a. Exemplary Method

Figure 6:
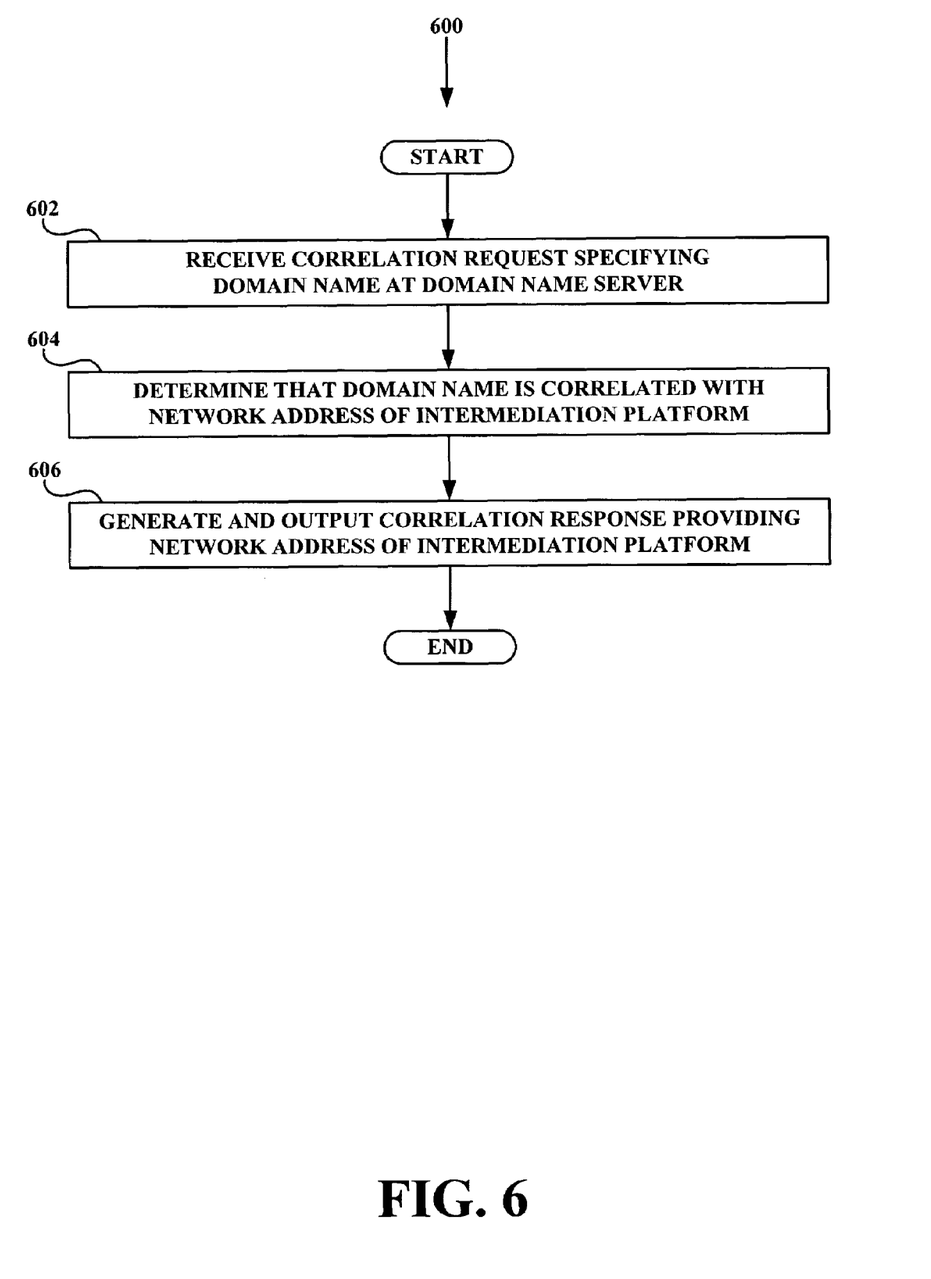
FIG. 6 is a flowchart of an exemplary embodiment, in the form of a method carried out along the communication system of FIG. 1.

FIG. 6 is a flowchart of an exemplary embodiment, in the form of a method carried out along the communication system of FIG. 1. As shown in FIG. 6, the method 600 begins at step 602, when DNS 104 receives a correlation request (DNS query) specifying a domain name and seeking a network address correlated with that domain name. The correlation request could come from any entity and be directed to any domain name; in this example, the request comes from gateway 106 and is directed to the domain name www.wsj.com. Prior to step 602, gateway 106 received an HTTP request from web client 112, requesting content from www.wsj.com.

As can be observed in FIG. 5, DNS 104 stores, in row 454 of table 450, a correlation between that domain name, a host server IP address (179.200.136.002), a Boolean flag indicating that this domain name is correlated with an intermediation platform network address, and that intermediation platform network address (146.134.102.100). In this example, the host server IP address in row 454 is the IP address of web server 110, and the intermediation platform network address in row 454 is the IP address of intermediation platform 108.

At step 604, upon receiving the correlation request of step 602, DNS 104 determines by reference to stored whitelist data (here, table 450) that www.wsj.com is correlated with the IP address of intermediation platform 108 (146.134.102.100).

At 606, DNS 104 generates and outputs, in response to the correlation request of step 602, a correlation response providing the IP address of intermediation platform 108 as the IP address correlated with www.wsj.com. DNS 104 transmits this correlation response to gateway 106. Upon receiving the response, gateway 106 reads the IP address of intermediation platform 108 from the response, and then transmits the earlier-received HTTP request to that IP address.

Note that gateway 106 may then cache the IP address of intermediation platform 108 in such a way that the IP address is associated with the domain name www.wsj.com. For example, gateway 106 may maintain a data table somewhat similar to table 450 of FIG. 5, which contains at least a column for domain names and a column for IP addresses associated with those domain names, and where each row in the table would correspond to a particular domain name and its associated IP address.

Thus, if gateway 106 were to receive subsequent requests from web client 112 or other web clients for content from www.wsj.com, gateway 106 could reference its local table using that domain name as a key, and thereby determine that those requests should be sent to the IP address of intermediation platform 108. This reference to a local table is sometimes known as a virtual DNS query. Gateway 106 could then transmit each such subsequent request to the IP address of intermediation platform 108. Preferably, gateway 106 would only maintain cached entries of this nature for a limited time, to account for the fact that the correlations between domain names and IP addresses stored by DNS 104 are subject to periodically change.

Once intermediation platform 108 receives the HTTP request from gateway 106, intermediation platform 108 can then perform one or more intermediation actions with respect to the request. For example, the intermediation platform could engage in interstitial communication with web client 112 to seek user payment for the requested content. As another example, intermediation platform 108 could supplement the HTTP request with certain information, such as user-payment information or other information. As yet another example, the intermediation platform may modify the HTTP request by subtraction rather than or along with by addition; the intermediation actions could involve removing data from the HTTP request. For example, the intermediation platform could remove personally-identifying information for privacy reasons, or other types of information for other reasons. Other examples are possible as well.

Following the performance of one or more intermediation actions by intermediation platform 108 with respect to the HTTP request from web client 112, intermediation platform 108 may then be configured to send that HTTP request to the actual host web server for which it was originally intended. To accomplish this, intermediation platform 108 may need to query DNS 104. Thus, intermediation platform 108 would send a correlation request to DNS 104, directed to the domain name www.wsj.com. Upon receipt of this correlation request, DNS 104 would determine by reference to row 454 of table 450 that www.wsj.com is correlated with the intermediation platform IP address 146.134.102.100.

However, DNS 104 is programmed to recognize that this IP address is also the source IP address of the correlation request itself, since that request came from intermediation platform 108. To avoid an infinite loop of messaging, DNS 104 acts on this case by transmitting a correlation response to intermediation platform 108 that informs intermediation platform 108 that www.wsj.com is correlated with the actual host server IP address 179.200.136.002, which can be seen is the entry in the second column of row 454 of table 450. When intermediation platform 108 receives this correlation response, assuming intermediation platform 108 does not opt to block or redirect the HTTP request, intermediation platform 108 may then transmit the perhaps-now-modified HTTP request to that actual host server IP address.

As described herein, DNS 104 would respond to subsequent correlation requests directed to www.wsj.com by similarly transmitting correlation responses that include the IP address of intermediation platform 108. Also, DNS 104 may correlate more than one domain name with the same intermediation platform IP address, as depicted in rows 454 and 458 of table 450. For example, a correlation request directed to www.tribune.com would also cause DNS 104 to transmit a correlation response that contains the IP address of intermediation platform 108. DNS 104 may also correlate two different domain names with the IP addresses of two different intermediation platforms, as depicted in rows 458 and 460 of table 450.

And any such subsequent correlation responses may originate due to additional HTTP or other web requests from web client 112, from other web clients, or from other network entities (not shown), and these correlation responses may come from gateway 106 or from other network gateways or entities (not shown). Note also that, from time to time, DNS 104 may receive conventional multicast updates or other messages that update DNS 104's whitelist data, which DNS 104 may store as described with respect to table 450 of FIG. 5. A whitelist table such as table 450 stored by a DNS such as DNS 104 would typically include many more entries than are shown for purposes of illustration in rows 452-460 of table 450; this potential for expansion is represented in FIG. 5 by the empty rows 462-466. Furthermore, a carrier could in theory deploy more than one DNS arranged as described above with respect to DNS 104, to correlate domain names with intermediation IP addresses.

Gateway 106, as well as any other network gateway or entity carrying out the functions described herein may come in a number of forms. As examples, any of these network entities could be a wireless access gateway, a voice command gateway, or an ISP (Internet Service Provider) gateway. Furthermore, any of these gateways could be integrated into a network device that provides some or all of the functionality of more than one of these gateway types, as well as other network functions. When DNS 104 receives a correlation request from gateway 106 or another network gateway, DNS 104 transmits the responsive correlation response to the gateway that sent the correlation request. With respect to location, any or all of gateway 106, any other gateways or network entities, intermediation platform 108, DNS 104, and any other DNS, may be situated anywhere on network 102. As an example, any or all of these entities could be situated on a wireless carrier's packet network, such as network 218 of FIG. 2.

A significant advantage of the invention, as noted above, is that DNS 104 can conveniently redirect web requests to an intermediation platform, even if those web requests pass through disparate communication paths, each possibly operating with different transport and application-layer protocols. As an example of this, consider a scenario where a telecom carrier operates (i) a 2G wireless web access system, (ii) a 3G wireless web access system, (iii) a voice command web access system, and (iv) a conventional landline web access system.

For the 2G and 3G wireless web access systems, the carrier may operate multiple radio access networks that serve wireless communication devices (such as wireless personal digital assistants (PDAs) or web-capable cell phones), and the carrier may force all 2G web traffic through one of several WAP (Wireless Access Protocol) gateways distributed throughout the carrier's network, and all 3G web traffic through one of several next-generation web gateways distributed throughout the carrier's network. Assume further that 2G web requests are conveyed as WML/HDML over UDP/IP, and 3G web requests are conveyed as HTML over TCP/IP.

For the voice command web access system, the carrier may operate a voice command gateway that interfaces with users via voice (e.g., telephone) communication and runs a voice browser such as a VXML-based browser on behalf of users. Assume in this arrangement that web requests arrive at the voice command gateway as voice and are conveyed from there to a web host as HTTP requests. For the conventional landline web access system, the carrier may operate an ISP gateway through which web requests pass as HTML over TCP/IP.

In this arrangement, the carrier may conveniently employ a common primary DNS, to which all of the carrier's WAP gateways, next generation gateways, voice command gateways, and ISP gateways will send correlation requests. (The carrier could hard program the IP address of DNS 104 into all of the carrier's gateways. Alternatively, each gateway could conventionally query a "root DNS," which could be set to return the IP address of DNS 104 in each instance.)

Thus, continuing with the examples above, when a first one of the carrier's gateways receives a web request seeking content from the URL www.wsj.com/article001.html, the first gateway would send a correlation request seeking the host IP address corresponding to the domain name www.wsj.com, and DNS 104 would responsively return the IP address of intermediation platform 108 instead of the address of the actual host. The first gateway would then send the web request to that intermediation IP address, as if it were the host IP address.

In turn, when a second one of the carrier's gateways receives a web request seeking content from the URL www.wsj.com/article002.html, the second gateway would similarly send a DNS request seeking the host IP address corresponding to the domain name www.wsj.com, and DNS 104 would responsively return the IP address of intermediation platform 108 instead of the IP address of the actual web host. The second gateway would then send the web request to that intermediation IP address, as if it were the host IP address.

As described above, after a given gateway has sent a correlation request to DNS 104 and received a correlation response, the gateway would conventionally cache the returned IP address (for some period of time), so that the next time the gateway receives a web request seeking content from the same domain, the gateway could simply refer to its cache to determine the corresponding IP address. For purposes of the present invention, each such query to the cache is considered a type of DNS correlation request, namely a virtual DNS request to DNS 104, provided that the information returned in response to the query is information that was earlier provided by a correlation response from DNS 104.

b. Exemplary Call Flow

Figure 7:
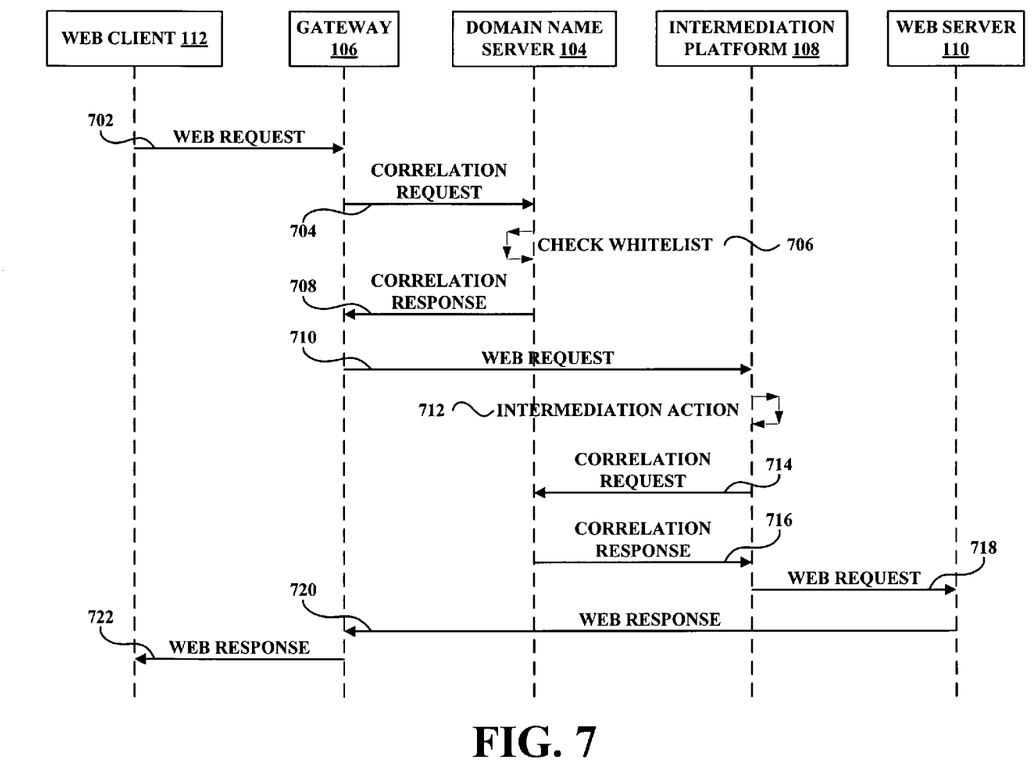
FIG. 7 is a call flow diagram, illustrating an example of the messaging and processing that may occur in accordance with exemplary embodiments.

FIG. 7 is a call flow diagram, illustrating an example of the messaging and processing that may occur in accordance with exemplary embodiments. The call flow of FIG. 7 begins at 702, when web client 112 transmits a web request, such as an HTTP request, to gateway 106. As explained above, web client 112 may be a web browser executed by a cell phone, such as CWCD 202, and gateway 106 may be a functional part of PDSN 216. In this example, the HTTP request of step 702 requests the URL www.wsj.com/index.html.

At 704, gateway 106 transmits a correlation request (DNS query) to DNS 104, requesting an IP address correlated with the domain name www.wsj.com. At 706, DNS 104 checks its whitelist data stored in table 450, and determines that row 454 of table 450 indicates that www.wsj.com is associated with the IP address of intermediation platform 108, specifically 146.134.102.100. At 708, DNS 104 transmits a correlation response to gateway 106, conveying to gateway 106 that intermediation platform IP address.

At 710, gateway 106 transmits the HTTP request that gateway 106 received from web client 112 at step 702 to intermediation platform 108 by transmitting the HTTP request to the intermediation platform network address received at step 708. At 712, intermediation platform 108 performs one or more intermediation actions with respect to the HTTP request, such as seeking payment from web client 112, supplementing the HTTP request with user-payment information or other data, any combination of these, or any other intermediation actions.

Intermediation platform 108 now prepares to send the perhaps-modified HTTP request to the actual host web server for which it was originally intended. So, at 714, intermediation platform 108 transmits a correlation request directed to the domain name www.wsj.com to DNS 104. DNS 104 will then refer to its whitelist data stored in table 450, and identify by reference to row 454 that www.wsj.com is correlated with the intermediation platform IP address of intermediation platform 108. DNS 104 recognizes, however, that that intermediation platform IP address is also the source address of the correlation request of step 714.

To avoid an infinite messaging loop, at 716, DNS 104 transmits a correlation response to intermediation platform 108, indicating that 179.200.136.002 is the IP address correlated with the domain name www.wsj.com. As seen in the second column of row 454 of table 450, this address is associated with the actual web host server having the domain name www.wsj.com. Here, the host server is web server 110. As such, at 718, intermediation platform 108 transmits the perhaps-now-modified HTTP request to web server 110. At 720, web server 110 transmits an HTTP response to gateway 106, which, at 722, sends the response to web client 112.

4. Conclusion

Various exemplary embodiments have been described above. Those skilled in the art will understand, however, that changes and modifications may be made to those examples without departing from the scope of the claims.

What is claimed is:

1. A domain name server comprising:
data storage containing (i) host data that correlates each of a plurality of domain names with a respective host server network address, including correlating a given domain name with a given host server network address that is associated with a given host server and (ii) whitelist data that correlates at least the given domain name with an intermediation platform network address that is associated with an intermediation platform; and
a communication interface for receiving correlation requests and for transmitting correlation responses,
wherein when the domain name server receives a correlation request that seeks a network address correlated with the given domain name, the domain name server determines by reference to the whitelist data that the given domain name is correlated with the intermediation platform network address, and responsively returns a correlation response comprising (a) the intermediation platform network address as the network address correlated with the given domain name when the correlation request has a source address not equal to the intermediation platform network address and (b) the given host server network address as the network address correlated with the given domain name when the correlation request has a source address equal to the intermediation platform network address.

2. The domain name server of claim 1, further comprising:
at least one processor; and
program instructions stored in the data storage and executable by the at least one processor to (i) receive the correlation request, (ii) determine by reference to the whitelist data that the given domain name is correlated with the intermediation platform network address, and (iii) responsively return the correlation response.

3. The domain name server of claim 1, wherein the intermediation platform network address comprises an Internet Protocol (IP) address, and wherein each respective host server network address comprises an IP address.

4. The domain name server of claim 1, situated on a network operated by a wireless carrier.

5. A method comprising:
receiving at a domain name server a first correlation request that specifies a first domain name and seeks a network address correlated with the first domain name, wherein the domain name server maintains (i) host data that correlates the first domain name with a network address of a host server having the first domain name and (ii) whitelist data that correlates the first domain name with a first network address, wherein the first network address is a network address of a first intermediation platform;

making a first determination by reference to the whitelist data that the first domain name is correlated with the first network address; and in response to making the first determination, generating and outputting from the domain name server, in response to the first correlation request, a first correlation response comprising (a) the first network address as the network address correlated with the first domain name when the first correlation request has a source address not equal to the first network address and (b) the network address of the host server having the first domain name as the network address correlated with the first domain name when the first correlation request has a source address equal to the first network address.

6. The method of claim 5, wherein the first network address comprises an Internet Protocol (IP) address.

7. The method of claim 5, wherein:
receiving the first correlation request comprises receiving the first correlation request from a first network gateway; and
outputting the first correlation response comprises sending the first correlation response to the first network gateway.

8. The method of claim 7, wherein the first network gateway is a wireless access gateway or a voice command gateway.

9. The method of claim 7, further comprising:
receiving at the domain name server a second correlation request that specifies a second domain name and seeks a network address correlated with the second domain name, wherein the host data correlates the second domain name with the network address of a host server having the second domain name, and wherein the whitelist data correlates the second domain name with a second network address, wherein the second network address is a network address of a second intermediation platform;
making a second determination by reference to the whitelist data that the second domain name is correlated with the second network address; and
in response to making the second determination, generating and outputting from the domain name server, in response to the second correlation request, a second correlation response comprising (a) the second network address as the network address correlated with the second domain name when the second correlation request has a source address not equal to the second network address and (b) the network address of the host server having the second domain name as the network address correlated with the second domain name when the second correlation request has a source address equal to the second network address.

10. The method of claim 9, wherein:
the second domain name is the same as the first domain name;
the second intermediation platform is the same as the first intermediation platform; and
the second network address is the same as the first network address.

11. The method of claim 9, wherein:
the second domain name is different from the first domain name;
the second intermediation platform is the same as the first intermediation platform; and
the second network address is the same as the first network address.

12. The method of claim 9, wherein:
receiving the second correlation request comprises receiving the second correlation request from a second network gateway; and
outputting the second correlation response comprises sending the second correlation response to the second network gateway.

13. The method of claim 12, wherein the second network gateway is a wireless access gateway or a voice command gateway.

14. The method of claim 5, further comprising:
receiving at a network entity a first web request directed to the first domain name;
sending from the network entity to the domain name server the first correlation request;
receiving at the network entity from the domain name server the first correlation response;
reading the first network address from the first correlation response; and
sending the first web request from the network entity to the first network address.

15. The method of claim 14, further comprising:
caching at the network entity a copy of the first network address, the copy being thereby associated at the network entity with the first domain name;
receiving at the network entity a second web request directed to the first domain name;
using the first domain name to retrieve the cached copy of the first network address; and
sending the second web request from the network entity to the first network address.

16. The method of claim 14, wherein the network entity is a wireless access gateway or a voice command gateway.

17. The method of claim 14, further comprising:
receiving the first web request at the first intermediation platform;
performing at least one intermediation action with respect to the first web request; and
sending the first web request from the first intermediation platform to the host server having the first domain name.

18. The method of claim 17, wherein performing at least one intermediation action comprises seeking payment from a first web client that sent the first web request to the network entity.

19. The method of claim 17, wherein performing at least one intermediation action comprises supplementing the first web request with at least one data value.

20. The method of claim 17, wherein performing at least one intermediation action comprises removing at least one data value from the first web request.

21. The method of claim 5, further comprising receiving at the domain name server at least one update to the whitelist data.

22. A computer-readable storage medium comprising instructions for causing a processor to carry out the following steps:
receiving at a domain name server a first correlation request that specifies a first domain name and seeks a network address correlated with the first domain name, wherein the domain name server maintains (i) host data that correlates the first domain name with a network address of a host server having the first domain name and (ii) whitelist data that correlates the first domain name with a first network address, wherein the first network address is a network address of a first intermediation platform;

making a first determination by reference to the whitelist data that the first domain name is correlated with the first network address; and in response to making the first determination, generating and outputting from the domain name server, in response to the first correlation request, a first correlation response comprising (a) the first network address as the network address correlated with the first domain name when the first correlation request has a source address not equal to the first network address and (b) the network address of the host server having the first domain name as the network address correlated with the first domain name when the first correlation request has a source address equal to the first network address.

23. A system comprising a domain name server, the domain name server comprising:

a domain-name-server processor, a domain-name-server communication interface configured to receive correlation requests and to transmit correlation responses, and domain-name-server data storage comprising:

host data correlating each of a plurality of domain names with a respective host server network address, including correlating a first domain name with a first host server network address that is associated with a first host server, whitelist data correlating the first domain name with a first intermediation platform network address that is associated with a first intermediation platform; and domain-name-server program instructions executable by the domain-name-server processor to:

receive at the domain name server a first correlation request seeking a network address correlated with the first domain name, make a first determination by reference to the whitelist data that the first domain name is correlated with the first intermediation platform network address, and in response to making the first determination, return from the domain name server, in response to the first correlation request, a first correlation response comprising (a) the first intermediation platform network address as the network address correlated with the first domain name when the first correlation request has a source address not equal to the first intermediation platform network address and (b) the first host server network address as the network address correlated with the first domain name when the first correlation request has a source address equal to the first intermediation platform network address.

24. The system of claim 23, wherein at least one of the first intermediation platform and the domain name server is situated on a network operated by a wireless carrier.

25. The system of claim 23, further comprising a network gateway and a second intermediation platform, wherein:

the whitelist data correlates a second domain name with a second intermediation platform network address that is associated with the second intermediation platform, and wherein the host data correlates the second domain name with a second host server network address that is associated with a second host server, and the domain-name-server program instructions further comprise instructions to:

receive at the domain name server from the network gateway a second correlation request seeking a network address correlated with the second domain name, make a second determination by reference to the whitelist data that the second domain name is correlated with the second intermediation platform network address, and in response to making the second determination, return from the domain name server to the network gateway, in response to the second correlation request, a second correlation response comprising (a) the second intermediation platform network address as the network address correlated with the second domain name when the second correlation request has a source address not equal to the second intermediation platform network address and (b) the second host server network address as the network address correlated with the second domain name when the second correlation request has a source address equal to the second intermediation platform network address.

26. The system of claim 23, further comprising a network entity comprising a network-entity communication interface, a network-entity processor, and network-entity data storage comprising network-entity program instructions executable by the network-entity processor to:

receive at the network entity a first web request directed to the first domain name;

send the first correlation request from the network entity to the domain name server;

receive the first correlation response at the network entity from the domain name server;

read the first intermediation platform network address from the first correlation response; and send the first web request from the network entity to the first intermediation platform network address.

27. The system of claim 26, wherein the network-entity program instructions further comprise instructions to:

cache at the network entity a copy of the first intermediation platform network address, the copy being thereby associated at the network entity with the first domain name;

receive at the network entity a second web request directed to the first domain name;

use the first domain name to retrieve the cached copy of the first intermediation platform network address; and send the second web request from the network entity to the first intermediation platform network address.

28. The system of claim 26, wherein the first intermediation platform comprises a first-intermediation-platform communication interface, a first-intermediation-platform processor, and first-intermediation-platform data storage comprising first-intermediation-platform program instructions executable by the first-intermediation-platform processor to:

receive at the first intermediation platform the first web request;

perform at least one intermediation action with respect to the first web request; and send the first web request from the first intermediation platform to the first host server.

* * * * *

UNITED STATES PATENT AND TRADEMARK OFFICE
CERTIFICATE OF CORRECTION

PATENT NO. : 7,600,011 B1
APPLICATION NO. : 10/982318
DATED : October 6, 2009
INVENTOR(S) : Robert Urbanek It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1148 days.

Signed and Sealed this

Fifth Day of October, 2010

David J. Kappos
*Director of the United States Patent and Trademark Office*